(12) United States Patent
Mathew et al.

(10) Patent No.: US 8,294,675 B2
(45) Date of Patent: Oct. 23, 2012

(54) TOUCHPAD AND PICK BUTTON ASSEMBLY

(75) Inventors: Dinesh Mathew, Fremont, CA (US);
Chris Ligtenberg, San Carlos, CA (US);
Brett William Degner, Menlo Park, CA (US); Thomas W. Wilson, Jr., Saratoga, CA (US); John Brock, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 793 days.

(21) Appl. No.: 12/241,015

(22) Filed: Sep. 29, 2008

(65) Prior Publication Data

US 2009/0174678 A1   Jul. 9, 2009

Related U.S. Application Data

(60) Provisional application No. 61/010,138, filed on Jan. 4, 2008, provisional application No. 61/010,726, filed on Jan. 11, 2008.

(51) Int. Cl.
| | |
|---|---|
| G06F 3/041 | (2006.01) |
| G06F 3/045 | (2006.01) |
| G06F 3/042 | (2006.01) |
| G06F 3/043 | (2006.01) |
| G06F 3/044 | (2006.01) |
| G06F 3/046 | (2006.01) |
| G06F 3/033 | (2006.01) |
| G06K 11/06 | (2006.01) |
| G08C 21/00 | (2006.01) |
| G06C 21/00 | (2006.01) |

(52) U.S. Cl. ........ 345/173; 345/174; 345/175; 345/176; 345/177; 345/178; 178/18.01; 178/18.02; 178/18.03; 178/18.04; 178/18.05; 178/18.06; 178/18.07; 178/18.08; 178/18.09; 178/18.11; 178/19.01; 178/19.02; 178/19.03; 178/19.04; 178/19.05; 178/19.06; 178/19.07; 178/20.01

(58) Field of Classification Search ..................... 361/679.21–679.61, 805–810; 345/173–178; 178/18.01–20.04; 200/5 R, 200/5 A, 600, 520, 293, 296, 341, 345
See application file for complete search history.

(56) References Cited

U.S. PATENT DOCUMENTS

| | | | | |
|---|---|---|---|---|
| 6,546,782 | B1* | 4/2003 | De La Cruz et al. | 73/7 |
| 7,263,028 | B2* | 8/2007 | Thomas et al. | 367/1 |
| 2002/0155784 | A1* | 10/2002 | Robertson et al. | 446/476 |
| 2006/0044751 | A1* | 3/2006 | Peng et al. | 361/686 |
| 2006/0164400 | A1* | 7/2006 | Sun et al. | 345/173 |
| 2007/0236473 | A1* | 10/2007 | Hong et al. | 345/173 |
| 2008/0026700 | A1* | 1/2008 | Smith | 455/90.2 |

* cited by examiner

*Primary Examiner* — Bipin Shalwala
*Assistant Examiner* — Hang Lin
(74) *Attorney, Agent, or Firm* — Kramer Levin Naftalis & Frankel LLP

(57) ABSTRACT

A touchpad assembly for use in an electronic device is provided. The touchpad assembly may include a touchpad frame operative to be placed within an opening in an electronic device frame. The touchpad assembly may include a support plate for supporting a touchpad, and a bracket for receiving a pick button. The support plate and bracket may be manufactured into a same component to increase the rigidity of the touchpad assembly. The pick button may include a varying height to prevent the pick button from deflecting and to make the pick button travel for providing a selection instruction uniform. The pick button may be coupled to the frame using any suitable approach, including using springs connected the ends of the pick button to the frame. The frame may also include pads to muffle the sound of the pick button when it returns to its initial position after having been pressed.

44 Claims, 4 Drawing Sheets

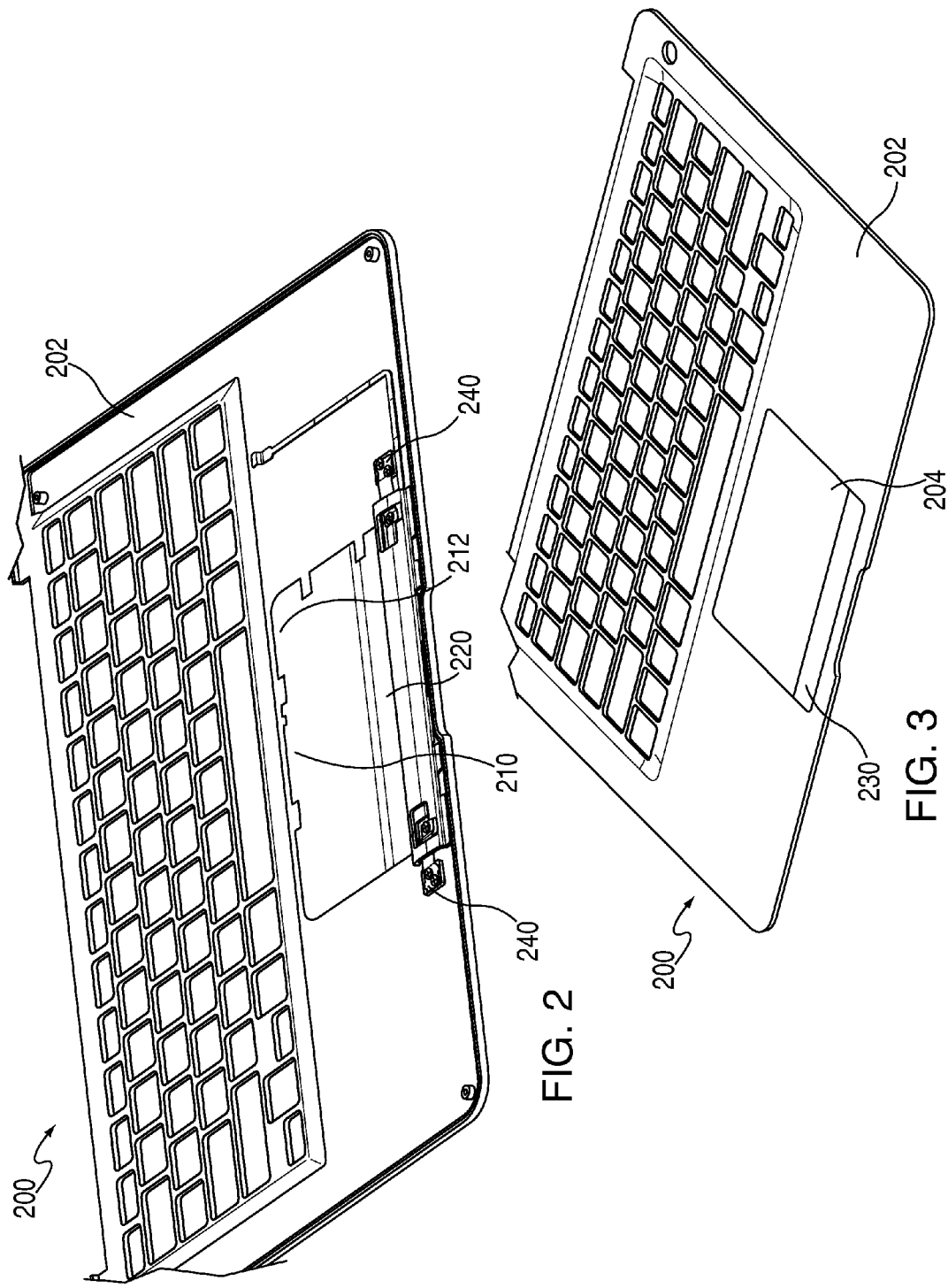

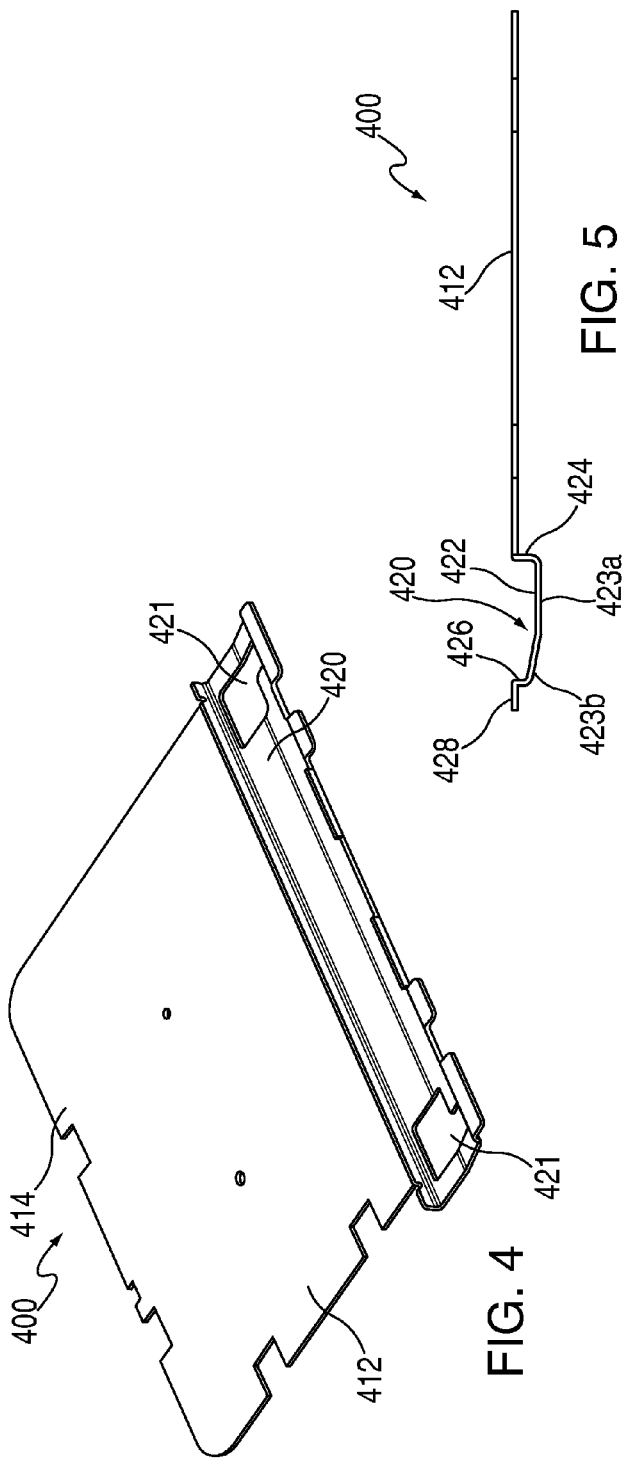

TOUCHPAD AND PICK BUTTON ASSEMBLY

CROSS-REFERENCE TO RELATED APPLICATIONS

This application claims the benefit of U.S. Provisional Application No. 61/010,138, filed Jan. 4, 2008, and of U.S. Provisional Patent Application No. 61/010,726, filed Jan. 11, 2008, both of which are incorporated by reference herein in their entireties.

BACKGROUND OF THE DISCLOSURE

This invention is directed to a touchpad assembly for use in an electronic device.

Some electronic devices, and in particular laptop and desktop computers, may include several types of input mechanisms. One of the input mechanisms may include a touchpad (e.g., for controlling a pointer displayed on a screen) and one or more buttons (e.g., a pick button to provide selection instructions). The touchpad and pick button may be coupled to the electronic device using several different approaches. In some embodiments, the electronic device may include a first opening through which a user may access the touchpad, and a second opening through which the pick button may extend.

In many electronic devices, the pick button provided is relatively small, and may be supported from within the electronic device using one or more springs (e.g., helical springs) compressed underneath the pick button. In addition, the small size of the button allows a user to actuate the button by depressing the button with the same amount of force independent of where the button is pressed—in other words, the small size of the button prevents it from deflecting away from a switch located underneath the button. While such existing touchpad assemblies may be sufficient for smaller touchpads and pick buttons, they lack the mechanical features necessary to provide proper support and a pleasant user experience when the touchpad, pick button, or both become larger (e.g., for example in a multi-touchpad) or are placed in smaller electronic devices (e.g., very thin laptop computers, such as the MacBook Air™, available from Apple Inc. of Cupertino, Calif.).

SUMMARY OF THE DISCLOSURE

Touchpad assemblies for use in an electronic device are provided. The touchpad assemblies may be operative to support large touchpads (e.g., a multi-touchpad) and associated large pick buttons (e.g., a pick button extending the length of the multi-touchpad).

In some embodiments, a touchpad assembly may be provided. The touchpad assembly may include a pick button and an assembly frame operative to be secured to an electronic device housing. The assembly frame may include a support plate operative to support a touchpad and a bracket coupled to a side of the support plate such that the bracket defines a recess. The pick button may be placed within the recess such that a switch is located between the pick button and the bracket. At least one spring may be coupled to an end of the pick button and to the housing to retain the pick button within the housing. In some embodiments, the pick button may include a rib or other element varying the cross-section of the button, for example to prevent the pick button from deflecting when it is pressed, or to make the distance traveled to actuate the switch uniform.

In some embodiments, an electronic device may be provided. The electronic device may include a housing with an opening, and an assembly frame operative to support a touchpad and a pick button. The assembly frame may be coupled to the housing such that a substantial portion of the assembly frame is accessible through the opening. A pick button may be placed in the assembly frame. At least one pad may be placed on the housing adjacent to the pick button such that the pad may muffle sounds created when the pick button is depressed (e.g., to actuate a switch).

In some embodiments, an assembly frame of a touchpad assembly may be provided. The assembly frame may include a support plate operative to support a touchpad, where the support plate includes at least one plate tab operative to be placed in contact with an electronic device housing. The assembly frame may also include a bracket operative to receive a pick button. The bracket may include at least one bracket tab operative to be placed in contact with the electronic device housing. To ensure that the support plate is sufficiently rigid, the support plate and bracket may be constructed from the same piece of material (e.g., stamped from a single piece of metal).

BRIEF DESCRIPTION OF THE DRAWINGS

The above and other features of the present invention, its nature and various advantages will be more apparent upon consideration of the following detailed description, taken in conjunction with the accompanying drawings in which:

FIG. 2 is a bottom, right, front perspective view of an illustrative assembled keyboard frame and touchpad assembly in accordance with some embodiments of the invention;

FIG. 3 is a top, right, front perspective view of the assembled keyboard frame and touchpad assembly of FIG. 2 in accordance with some embodiments of the invention;

FIG. 4 is a top, left, front perspective view of an illustrative touchpad assembly frame for use in an electronic device in accordance with some embodiments of the invention;

FIG. 5 is a cross-sectional view of the touchpad assembly frame of FIG. 4 in accordance with some embodiments of the invention;

FIG. 6 is a cross-sectional view of an illustrative touchpad assembly for use with an electronic device in accordance with some embodiments of the invention.

DETAILED DESCRIPTION OF THE DISCLOSURE

This invention is related to features of a pick button associated with a touchpad of any electronic device (e.g., a laptop computer).

Figure 1:
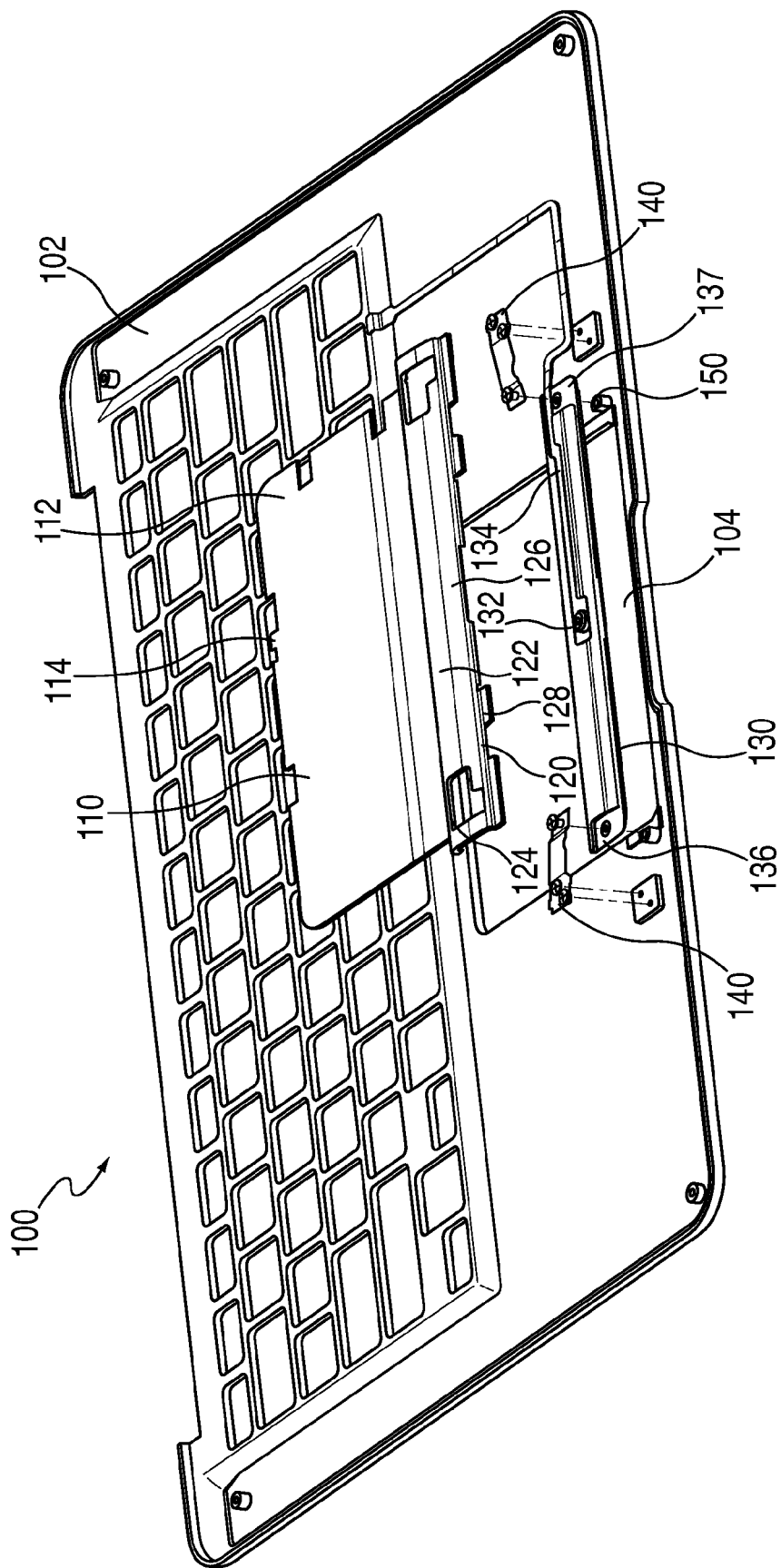
FIG. 1 is an exploded bottom, right, front perspective view of an illustrative touchpad assembly coupled to a keyboard frame in accordance with some embodiments of the invention.

FIG. 1 is an exploded perspective view of an illustrative touchpad assembly coupled to a keyboard frame in accordance with some embodiments of the invention. Frame 102 may define a structure on which different electronic device components may be mounted. For example, frame 102 may be a wall portion of an electronic device housing, and may include a keyboard frame for retaining keys used to provide inputs to the electronic device, and for providing access to a touchpad for controlling the display of content by the electronic device. Touchpad assembly 100 may include or be operative to support a touchpad and at least one pick button such that the touchpad and at least one pick button are accessible to a user through opening 104 of frame 102.

Touchpad assembly 100 may include assembly frame 110 operative to provide support for a touchpad. Assembly frame 110 may include several portions, including support plate 112 and bracket 120. Support plate 112 may be operative to provide support for a touchpad, such that support plate 112 may provide resistance for a user's finger as it moves across the touchpad. Support plate 112 may substantially match the size and shape of at least a portion of opening 104. In some embodiments, support plate 112 may be sized such that at least a portion of support plate 112 extends beyond the periphery of opening 104 on one or more sides of opening 104. For example, if opening 104 substantially defines a rectangle, support plate 112 may extend beyond the periphery of the sides of the rectangle other than the side adjacent to the pick button of touchpad assembly 100 (e.g., the side of opening 104 that is adjacent to the edge of frame 102).

In some embodiments, support plate 112 may include one or more tabs 114, for example, to allow wiring to connect a touchpad on the top surface of support plate 112 and electronic device components adjacent to the bottom surface of support plate 112. Instead or in addition, tabs 114 may be used to couple support plate 112 to frame 102, for example using a mechanical fastener (e.g., a screw), tape, an adhesive, an interlocking mechanism or component, or any other suitable approach.

Bracket 120 may define a trough or groove operative to receive a pick button 130. For example, bracket 120 may include recessed portion 122 defined by sidewalls 124 and 126. Bracket 120 may be coupled to support plate 112 using any suitable approach. For example, bracket 120 and support plate 112 may be manufactured as two distinct components and assembled together (e.g., using an adhesive, tape, a mechanical fastener, welding, soldering, or heat treatment). As another example, bracket 120 and support plate 112 may be manufactured as a single component (e.g., a single stamped component). Bracket 120 may be connected to support plate 112 by sidewall 124, and coupled to frame 102 using sidewall 126. For example, sidewall 126 may include one or more tabs 128 extending from the end of sidewall 126, for example, at substantially the same height as support plate 112. Tabs 128 may be sized such that tabs 128 extend beyond the periphery of opening 104 when assembly frame 110 is coupled to frame 102. For example, tabs 128 may be operative to extend over the side of the rectangle that is adjacent to the pick button of touchpad assembly 100 (e.g., the side of opening 104 that is adjacent to the edge of frame 102). Tabs 128 may be used to couple bracket 120 to frame 102 using any suitable approach, including for example using a mechanical fastener (e.g., a screw), tape, an adhesive, an interlocking mechanism or component, or any other suitable approach.

Support plate 112 and bracket 120 may be constructed from any suitable material. In particular, the material used for one or both of support plate 112 and bracket 120 may be selected from material having sufficient strength to resist pressure caused by a user's finger on the touchpad. The material used may also be selected based on weight, aesthetic, and ease of manufacturing considerations. For example, the material used for support plate 112 may include at least one of a metal, composite material, or plastic (e.g., a stamped aluminum or steel component).

Touchpad assembly 100 may include pick button 130 for providing inputs (e.g., selection instructions) to the electronic device. Pick button 130 may form an elongated structure having a substantially rectangular cross-section. Pick button 130 may be inserted in opening 104 such that the pick button is aligned with bracket 120. A switch 132 may be positioned between the lower surface of pick button 130 and bracket 120 such that when pick button 130 is pressed, pick button 130 may be brought in close proximity with bracket 120 such that switch 132 is compressed between the pick button and the bracket and thereby actuated. In some embodiments, switch 132 may be coupled to pick button 130 and connected to other electronic device components (e.g., other components located in proximity of frame 102) using trace 134.

Pick button 130 maybe coupled to frame 102 using any suitable approach. In some embodiments, pick button 130 may be coupled such that pick button 130 may be deflected to provide an input and return to a rest position in which switch 132 is not closed. For example, pick button 130 may be coupled to frame 102 using one or more pick button springs 140 coupled to ends 136 and 137 of pick button 130. Each of ends 136 and 137 may include a recessed platform for receiving a spring 140 such that the overall profile of pick button 130 and spring 140 may remain substantially the same (e.g., the depth of each recessed platform at ends 136 and 137 may be substantially equal to the thickness of spring 140). By providing springs that extend away from underneath pick button 130, the overall thickness of pick button 130 and bracket 120 (e.g., the distance between the top of pick button 130 and the bottom of bracket 120) may be minimized.

Springs 140 may include any suitable type of spring, including for example a tension spring, extension spring, compression spring, torsional spring, wire spring, coil spring, flat spring, cantilever spring, helical spring, hairspring, balance spring, leaf spring, or any other suitable type of spring. The springs may have any suitable spring constant or value defining the elasticity of the spring, including, for example, a value selected based on the distance required to actuate switch 132, the desired tactile feedback, and size considerations. Springs 140 may be coupled to pick button 130 and frame 102 using any suitable approach, including, for example, an adhesive, tape, mechanical fastener (e.g., a screw), an engagement mechanism (e.g., a snap), or any other suitable approach.

Pick button 130 may be coupled to touchpad assembly 100 such that tactile and audio feedback are provided when a user actuates the pick button. For example, pick button 130 may provide an audible "click" sound when a user presses pick button 130. To prevent audio feedback as the pick button returns to its initial position (e.g., so as not to confuse a user whether switch 132 was closed once or twice), frame 102 may include one or more pads 150 for muffling the sound of the pick button returning to the initial, un-clicked position.

FIG. 2 is a perspective view, similar to FIG. 1, of the bottom of an illustrative assembled frame and touchpad assembly in accordance with some embodiments of the invention. FIG. 3 is a perspective view of the top of the illustrative assembled frame and touchpad assembly in accordance with some embodiments of the invention. Touchpad assembly 200 may include assembly frame 210 coupled to frame 202. Pick button 230 and touchpad support plate 212 may be accessible from the outside of frame 202 through opening 204. Pick button 230 may be supported by bracket 220 of touchpad assembly frame 210, and retained at least partially within opening 204 by springs 240.

FIG. 4 is a perspective view of an illustrative assembly frame for use in an electronic device in accordance with some embodiments of the invention, and FIG. 5 is a cross-sectional view of the assembly frame of FIG. 4 in accordance with some embodiments of the invention. Assembly frame 400 may include support plate 412 and bracket 420, such that a touchpad may be placed on support plate 412 and a pick button may be positioned within bracket 420. Support plate 412 may form a substantially flat surface constructed from a suitable rigid material such that when a user presses the touchpad, support plate 412 may resist the user's contact and prevent the touchpad from flexing or deflecting during use.

Support plate 412 may have any suitable size. In some embodiments, support plate 412 may be larger than a touchpad placed on support plate 412. To couple support plate 412 to an electronic device frame, support plate 412 may include one or more tabs 414 operative to be placed adjacent to the electronic device frame (e.g., tabs 414 may extend beyond the periphery of an opening within the frame). Tabs 414 may extend from any suitable side of support plate 412, including for example from the three sides of support plate 412 that are not in contact with bracket 420 (e.g., the sides that extend beyond the periphery of the opening in the frame).

To ensure that sufficient support is provided to the remaining side of support plate 412, bracket 420, which may be coupled to the frame via tabs 428, may be coupled to support plate 412 such that the support provided to bracket 420 may be transferred to support plate 412. Bracket 420 and support plate 412 may be coupled using any suitable approach, including for example using welding, soldering, a mechanical fastener, an adhesive, tape, or any other suitable coupling mechanism that provides sufficient stiffness between bracket 420 and support plate 412 (e.g., to transfer the load). In some embodiments, bracket 420 and support plate 412 may be constructed from a single piece of material (e.g., stamped from a single sheet of metal). By combining bracket 420 and support plate 412, the two components of assembly frame 400 may support each other within an electronic device frame, and allow assembly frame 400 to be smaller, thus allowing more flexibility in the design of the electronic device.

Bracket 420 may be constructed using any suitable approach. In some embodiments, bracket 420 may include recessed portion 422, which may include a substantially flat surface. Recessed portion 422 may be placed in contact with a switch coupled to a pick button placed within bracket 420 to provide resistance for the switch to close when the pick button is pressed into bracket 420. Bracket 420 may include sidewalls 424 and 426 connecting recessed portion 422 to support plate 412 and tabs 428. Sidewalls 424 and 426 may have any suitable dimensions, and may be angled relative recessed portion 422 at any suitable angle (e.g., 90 degrees). Recessed portion 422 may include one or more apertures 421 providing clearance for springs used to couple the pick button to the electronic device. For example, recessed portion 422 may include two apertures 421 at opposite ends of recessed portion 422 to provide clearance for springs used to connect the ends of the pick button to an electronic device frame.

In some embodiments, the depth of recessed portion 422 may vary. As shown in FIG. 5, support plate 412 may constitute a substantially planar surface coupled to bracket 420. Recessed portion 422 may include planar portion 423a, which may be substantially parallel to support plate 412 and may be connected to support plate 412 by sidewall 424, and angled portion 423b, which may be a prolongation of planar portion 423a that is substantially planar and slightly angled away from planar portion 423a. The end of angled portion 423b may be coupled to sidewall 426, which may in turn be coupled to tab 428 for connecting assembly frame 400 to an electronic device frame. The dimensions and orientations of planar portion 423a, angled portion 423b, and sidewalls 424 and 426 may be selected based on any suitable criteria, including for example dimensions of the pick button placed in bracket 420.

FIG. 6 is a cross-sectional view of an illustrative touchpad assembly for use with an electronic device in accordance with some embodiments of the invention. Touchpad assembly 600 may include assembly frame 610 and pick button 630. Touchpad assembly 600 may be coupled to frame 602 of the electronic device, for example using tab 628 of assembly frame 610. Assembly frame 610 may include support plate 612 and bracket 620, and may be coupled to frame 602 such that portions of support plate 612 and bracket 620 may be accessible through an opening of frame 602. Pick button 630 may be positioned within bracket 620 such that switch 632 may be placed between bottom surface 634 of pick button 630 and planar portion 623a of recessed portion 622 of bracket 620. In addition, bottom surface 634 and planar portion 623a may be substantially parallel to ensure that proper contact is maintained with switch 632. The thickness of pick button 630 and depth of recessed portion 622 (e.g., determined by the length of sidewalls 624 and 626) may be selected such that switch 632 may be substantially in contact with both bottom surface 634 and planar portion 623a without being actuated when pick button 630 is at rest.

Pick button 630 may have any suitable profile. In particular, the profile of pick button 630 may be selected such that a user must deflect pick button 630 by the same amount wherever the user places his finger (e.g., on a portion of pick button 630 near tab 628 or near support plate 612). For example, pick button 630 may include a variable cross-section based on the distance of each portion of pick button 630 to switch 632. In particular, pick button 630 may include angled face 633 connecting proximal end 635 of pick button 630 to the portion of pick button 630 adjacent to switch 632 (e.g., bottom surface 634). Instead of using a symmetrical or similar angled portion between the portion of pick button 630 adjacent to switch 632 and distal end 636, pick button 630 may include rib 637 having a larger width than other portions of pick button 630 to reduce the travel necessary to close switch 632 when a user presses pick button 630 near distal end 636. In some embodiments, rib 637 may also be operative to prevent pick button 630 from deflecting or bending when a user presses an area near distal end 636 or near a tip portion of button 630 (e.g., proximate a spring of the assembly), which would increase the travel required by button 630 to actuate switch 632 or prevent button 630 from actuating switch 632 altogether.

Figure 7:
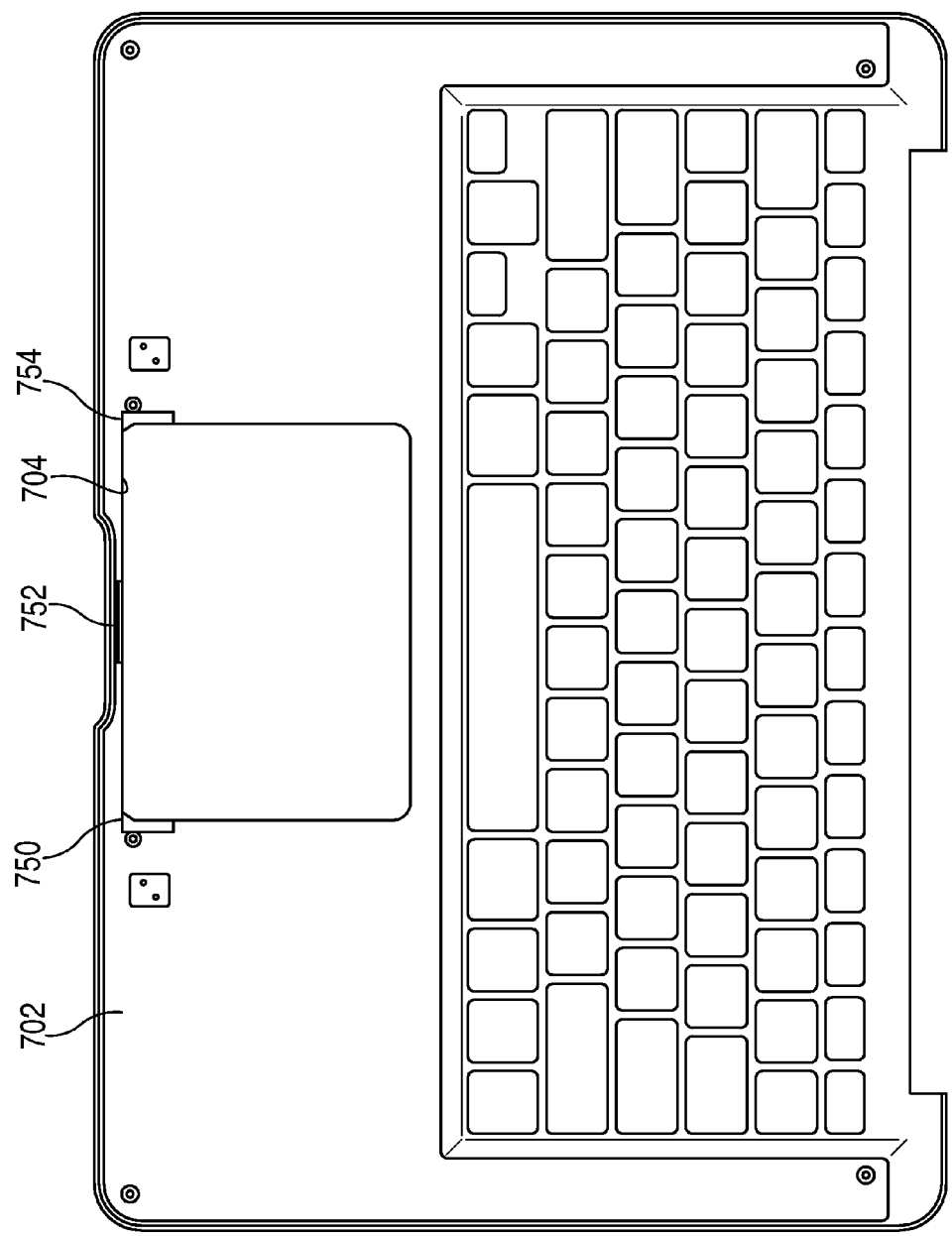
FIG. 7 is a bottom view of an illustrative frame having acoustic pads in accordance with some embodiments of the invention.

In some embodiments, the touchpad assembly may include one or more components for modifying or controlling tactile feedback, audio feedback, or both provided in response to a user pressing the pick button and closing the switch (e.g., inverting a dome switch positioned underneath the pick button). FIG. 7 is a bottom view of an illustrative frame having acoustic pads for controlling audio feedback in accordance with some embodiments of the invention. Frame 702 may include opening 704 for receiving a touchpad assembly. To reduce the sound of a pick button striking frame 702 when it is pressed, frame 702 may include pads 750, 752, and 754 operative to muffle the sound of the pick button. Pads 750, 752, and 754 may be positioned at any suitable position on frame 702, including for example in the center of opening 704 (e.g., pad 752), and near the tips of the pick button (e.g., pads 750 and 754). Pads 750, 752, and 754 may be constructed from any suitable material, including for example Mylar, felt, plastic, hook and fastener material, a composite material, or any other suitable material. In some embodiments, the material used may be selected in particular for audio muffling properties (e.g., to muffle the sound of a button "clicking" as it returns to an un-clicked initial state).

The above-described embodiments of the invention are presented for purposes of illustration and not of limitation, and the invention is limited only by the claims which follow.

What is claimed is:

1. A touchpad assembly comprising:
a switch;
an assembly frame operative to be secured to an electronic device housing,
the assembly frame comprising:
a support plate operative to support a touchpad;
and a bracket coupled to a side of the support plate, the bracket defining a recess;
a pick button operative to be placed within the recess such that the switch is located between the pick button and the bracket;
and at least one spring coupled to a first end of the pick button and to the housing,
wherein the assembly frame is not coupled to the pick button,
and wherein the assembly frame is not coupled to the at least one spring.

2. The touchpad assembly of claim 1, wherein the switch is coupled to a bottom surface of the pick button.

3. A touchpad assembly comprising:
a switch;
an assembly frame comprising:
a support plate operative to support a touchpad;
and a bracket coupled to a side of the support plate, the bracket defining a recess; a pick button operative to be placed within the recess;
and at least one spring coupled to the pick button, wherein:
the switch is coupled to a first portion of the bottom surface of the pick button such that the switch is located between the pick button and the bracket;
the at least one spring allows the pick button to be deflected for actuating the switch and then returns the pick button to its initial position;
and the pick button comprises a rib extending substantially the length of the bottom surface of the pick button and adjacent to the first portion of the bottom surface and the switch;
wherein the rib causes the deflection of the pick button for actuating the switch to be the same independent of the location on the pick button of the force causing the deflection.

4. The touchpad assembly of claim 1, wherein the support plate comprises at least one plate tab for coupling the support plate to the housing.

5. The touchpad assembly of claim 4, wherein the bracket comprises at least one bracket tab for coupling the bracket to the housing.

6. The touchpad assembly of claim 1, wherein the support plate and the bracket are manufactured from a single piece of material.

7. The touchpad assembly of claim 1, wherein the at least one spring comprises a flat spring coupled to the first end of the pick button.

8. The touchpad assembly of claim 7, further comprising a mechanical fastener coupling the flat spring to the pick button.

9. An electronic device, comprising:
a housing comprising an opening;
an assembly frame operative to support a touchpad and a pick button,
the assembly frame coupled to the housing such that a substantial portion of the assembly frame is accessible through the opening;
the assembly frame comprising: a support plate operative to support a touchpad;
and a bracket coupled to a side of the support plate, the bracket defining a recess;
a pick button operative to be placed within the recess such that a switch is located between the pick button and the bracket;
at least one spring operative to allow a top surface of the pick button to be deflected away from a bottom surface of the housing for actuating the switch and to then return the top surface of the pick button towards the bottom surface of the housing; and
at least one pad placed between the bottom surface of the housing and the top surface of the pick button,
the at least one pad operative to muffle sounds created when the top surface of the pick button is returned towards the bottom surface of the housing;
and the at least one spring coupled to a first end of the pick button and to the housing,
wherein the assembly frame is not coupled to the pick button,
and wherein the assembly frame is not coupled to the at least one spring.

10. The electronic device of claim 9, wherein the at least one pad comprises a plurality of pads disposed adjacent to the opening in the housing.

11. The electronic device of claim 10, wherein some of the plurality of pads are positioned adjacent to the ends of the pick button.

12. The electronic device of claim 9, wherein the at least one pad is manufactured from at least one of Mylar, felt, plastic, hook and fastener material, and a composite material.

13. An assembly frame for use in a touchpad assembly, comprising:
a support plate operative to support a touchpad,
the support plate comprising at least one plate tab operative to be placed in contact with an electronic device housing;
a bracket operative to receive a pick button,
the bracket comprising:
at least one bracket tab operative to be placed in contact with the electronic device housing;
a recessed portion;
a first sidewall extending downwardly from the support plate to the recessed portion;
and a second sidewall extending upwardly from the recessed portion to the at least one bracket tab,
wherein the support plate and bracket are constructed from the same piece of material;
a pick button operative to be placed within the recess such that a switch is located between the pick button and the bracket;
and at least one spring coupled to a first end of the pick button and to the housing,
wherein the assembly frame is not coupled to the pick button,
and wherein the assembly frame is not coupled to the at least one spring.

14. The assembly frame of claim 13, wherein the assembly frame is manufactured by stamping a single piece of material.

15. The assembly frame of claim 13, wherein the piece of material comprises a piece of metal.

16. The touchpad assembly of claim 1, wherein the end of the pick button comprises a recessed portion, and wherein a first portion of the at least one spring is coupled to the pick button within the recessed portion.

17. The touchpad assembly of claim 16, wherein the depth of the recessed portion is equal to the thickness of the first portion of the at least one spring.

18. The touchpad assembly of claim 1, further comprising at least one other spring coupled to a second end of the pick button and to the housing.

19. The touchpad assembly of claim 18, wherein the assembly frame is not coupled to the at least one other spring.

20. The touchpad assembly of claim 1, wherein the at least one spring allows the pick button to be deflected for actuating the switch and then returns the pick button to its initial position.

21. The touchpad assembly of claim 1, wherein a first portion of the at least one spring is coupled to a bottom surface of the pick button, wherein a second portion of the at least one spring is coupled to the housing, and wherein a third portion of the at least one spring extends away from underneath the pick button and couples the first portion to the second portion.

22. The touchpad assembly of claim 1, wherein the bracket comprises at least one aperture that provides clearance for the at least one spring.

23. The touchpad assembly of claim 1, wherein the touchpad is provided on a top surface of the support plate, and wherein the top surface provides resistance for a user's finger as the finger moves across the touchpad.

24. The touchpad assembly of claim 23, wherein the support plate and bracket are constructed from the same piece of material.

25. The touchpad assembly of claim 3, wherein the rib is positioned between the first portion of the bottom surface and a distal end of the pick button that is near the support plate.

26. The touchpad assembly of claim 3, wherein:
the pick button further comprises a first end, a second end opposite the first end, a distal end adjacent the support plate when the pick button is placed within the recess, and a proximal end opposite the distal end; and
the length of the bottom surface extends between the first end and the second end.

27. The touchpad assembly of claim 26, wherein:
the assembly frame is operative to be secured to an electronic device housing; and
the at least one spring is coupled to the first end of the pick button and to the housing.

28. The touchpad assembly of claim 27, further comprising at least one other spring coupled to the second end of the pick button and to the housing.

29. The touchpad assembly of claim 26, wherein the rib is positioned between the first portion of the bottom surface and the distal end of the pick button.

30. The touchpad assembly of claim 26, wherein the pick button further comprises an angled face extending between the proximal end of the pick button and the first portion of the bottom surface.

31. The touchpad assembly of claim 26, wherein:
a first amount of deflection of the pick button is necessary to actuate the switch when the pick button is deflected at the first end of the pick button;
a second amount of deflection of the pick button is necessary to actuate the switch when the pick button is deflected between the first end of the pick button and the second end of the pick button; and
the rib is configured to allow the first amount of deflection to equal the second amount of deflection.

32. The electronic device of claim 9, wherein the electronic device is operative to provide an audible clicking sound when the top surface of the pick button is deflected away from the bottom surface of the housing for actuating the switch.

33. The electronic device of claim 32, wherein the at least one pad is operative to prevent any audible clicking sound from being provided when the top surface of the pick button is returned towards the bottom surface of the housing.

34. The electronic device of claim 9, wherein the at least one pad is operative to prevent the top surface of the pick button from striking the bottom surface of the housing.

35. The electronic device of claim 9, wherein the at least one spring is coupled to a first end of the pick button and a first portion of the bottom surface of the housing.

36. The electronic device of claim 35, wherein the at least one pad is coupled to a second portion of the bottom surface of the housing, wherein the second portion is positioned between the first portion and the opening.

37. The assembly frame of claim 13, wherein the recessed portion is operative to receive the pick button.

38. The assembly frame of claim 13, wherein:
the touchpad is provided along a planar top surface of the support plate; and
the top surface provides resistance for a user's finger as the finger moves across the touchpad.

39. The assembly frame of claim 38, wherein at least a portion of the recessed portion is parallel to the planar top surface.

40. The assembly frame of claim 13, wherein:
the touchpad is provided along a planar top surface of the support plate;
the planar top surface exists in a first plane;
at least a portion of the recessed portion is planar and exists in a second plane;
the first plane is parallel to the second plane; and
a depth of the bracket is defined by the distance between the first plane and the second plane.

41. The assembly frame of claim 13, wherein the first sidewall connects the recessed portion to the support plate.

42. The assembly frame of claim 13, wherein the second sidewall connects the recessed portion to the at least one bracket tab.

43. The assembly frame of claim 13, wherein the bracket comprises an aperture operative to provide clearance for the at least one spring.

44. The assembly frame of claim 13, wherein at least a portion of any support provided to the at least one bracket tab by the electronic device housing is transferred to the support plate.

* * * * *

UNITED STATES PATENT AND TRADEMARK OFFICE
CERTIFICATE OF CORRECTION

PATENT NO.       : 8,294,675 B2
APPLICATION NO.  : 12/241015
DATED            : October 23, 2012
INVENTOR(S)      : Dinesh Mathew et al.

It is certified that error appears in the above-identified patent and that said Letters Patent is hereby corrected as shown below:

Title Page, Item (57) Abstract, line 12, should be corrected as follows:

A touchpad assembly for use in an electronic device is provided. The touchpad assembly may include a touchpad frame operative to be placed within an opening in an electronic device frame. The touchpad assembly may include a support plate for supporting a touchpad, and a bracket for receiving a pick button. The support plate and bracket may be manufactured into a same component to increase the rigidity of the touchpad assembly. The pick button may include a varying height to prevent the pick button from deflecting and to make the pick button travel for providing a selection instruction uniform. The pick button may be coupled to the frame using any suitable approach, including using springs connecting the ends of the pick button to the frame. The frame may also include pads to muffle the sound of the pick button when it returns to its initial position after having been pressed.

In the Claims:

Claim 3, column 7, lines 24-45, should be corrected as follows:

3. A touchpad assembly comprising:
a switch;
an assembly frame comprising:
a support plate operative to support a touchpad;
and a bracket coupled to a side of the support plate, the
bracket defining a recess; a pick button operative to be
placed within the recess;
and at least one spring coupled to the pick button, wherein:
the switch is coupled to a first portion of the bottom surface
of the pick button such that the switch is located between
the pick button and the bracket;

Signed and Sealed this
Thirtieth Day of April, 2013

Teresa Stanek Rea
*Acting Director of the United States Patent and Trademark Office* the at least one spring allows the pick button to be deflected
for actuating the switch and then returns the pick button
to its initial position;
and the pick button comprises a rib extending substantially
the length of the bottom surface of the pick button and
adjacent to the first portion of the bottom surface and the
switch, wherein the causes the deflection of the pick button for
actuating the switch to be the same independent of the location
on the pick button of the force causing the deflection.

Claim 9, Column 7, line 61 - Column 8, line 24, should be corrected as follows:

9. An electronic device, comprising:
a housing comprising an opening;
an assembly frame operative to support a touchpad and a
pick button, the assembly frame coupled to the housing such
that a substantial portion of the assembly frame is accessible
through the opening, the assembly frame comprising:
a support plate operative to support a touchpad;
and a bracket coupled to a side of the support plate, the
bracket defining a recess; a pick button operative to be placed
within the recess such that a switch is located between the pick
button and the bracket; at least one spring operative to allow a
top surface of the pick button to be deflected away from a bottom
surface of the housing for actuating the switch and to then return
the top surface of the pick button towards the bottom surface of the
housing; and at least one pad placed between the bottom surface
of the housing and the top surface of the pick button, the at least one
pad operative to muffle sounds created when the top surface of the
pick button is returned towards the bottom surface of the housing,
and the at least one spring coupled to a first end of the pick button
and to the housing, wherein the assembly frame is not coupled to
the pick button, and wherein the assembly frame is not coupled to
the at least one spring.